United States Patent [19]

Watson

[11] Patent Number: 4,477,224
[45] Date of Patent: Oct. 16, 1984

[54] HELICOPTER ROTOR

[75] Inventor: Kenneth Watson, Yeovil, England
[73] Assignee: Westland plc, Yeovil, England
[21] Appl. No.: 417,338
[22] Filed: Sep. 13, 1982
[30] Foreign Application Priority Data Sep. 18, 1981 [GB] United Kingdom ............... 8128362

[51] Int. Cl.³ .............................................. B64C 27/74
[52] U.S. Cl. ..................................................... 416/114
[58] Field of Search ................................ 416/112–115

[56] References Cited

U.S. PATENT DOCUMENTS

| 2,677,429 | 5/1954 | Laufer | 416/140 A X |
| 2,984,306 | 5/1961 | Kottsieper | 416/114 X |
| 3,080,002 | 3/1963 | Du Pont | 416/114 X |
| 4,093,400 | 6/1978 | Rybicki | 416/114 X |
| 4,302,154 | 11/1981 | Mack | 416/114 |
| 4,375,940 | 3/1983 | Lovera et al. | 416/114 |

FOREIGN PATENT DOCUMENTS 608459 9/1948 United Kingdom ............ 416/135 R

Primary Examiner—Everette A. Powell, Jr.
Attorney, Agent, or Firm—Larson and Taylor

[57] ABSTRACT

A helicopter rotor (10, 29) includes a rotor hub (11, 30) supporting a plurality of rotor blades, and a pitch control means comprising a universal joint (21, 45) adapted to permit both tilting and axial vertical movements of the control means to change the pitch of the rotor blades both cyclically and collectively. The universal joint has three radially extending pins (22) each supporting a radially slidable and rotatable bearing (23) having a spherical external surface (25), the bearings being located in generally axially extending tracks (26) having a circular cross-sectional shape for rolling engagement by the bearings.

Axial movements are permitted by rolling of the bearings along the tracks and tilting movements by a combination of rolling and a sliding movement of the bearings along the pins.

Several embodiments are described and illustrated.

9 Claims, 4 Drawing Figures

HELICOPTER ROTOR

DESCRIPTION OF INVENTION

This invention relates to helicopter rotors.

One known type of helicopter rotor includes pitch control means in the form of a centrally located control spindle. A lower end of the spindle is connected to cyclic and collective inputs operable by the pilot, and an upper end is connected to radially extending spider arms equal in number to the number of rotor blades. The spider arms are connected by adjustable connecting rods to pitch control arms attached to the rotor blades. During rotation of the rotor blades, cyclic pitch changes are accomplished by tilting of the lower end of the spindle in any direction, and collective pitch changes by axial movements of the spindle.

Since such movements have to be accomplished simultaneously, a support means, normally located intermediate the ends of the spindle, has also to be capable of simultaneous tilting and axial movements whilst rotating about the axis. Various forms of support means have been proposed and used, and these include a spherical bearing at the top of the spindle to accommodate tilting movement and located in a piston slidably mounted in an internal bearing surface in the rotor hub to accommodate axial movements. In one example of this type of control system, torque to rotate the control spindle is transmitted through spring means attached to surfaces of one of the spider arms contacting the surface of a slot in the rotor drive shaft through which the spider arm is located.

Another form of support means comprises a fabricated universal joint intermediate the ends of the spindle, and attached internally of a sleeve rotatably supported internally of the rotor hub to provide for tilting movements. Axial movements are provided by axially extending splines formed externally on a skirt portion of the sleeve and engaged in a splined ring supported from the rotor hub, and torque is transmitted from the rotor hub through the splines and the universal joint to rotate the control spindle.

Another known type of helicopter rotor utilises pitch control means in the form of a swash plate having a non-rotatable ring connected to a plurality of radially spaced-apart control rods and a rotatable ring connected either through radially extending spider arms or directly by adjustable connecting rods to pitch control arms attached to the blades. As in the previously mentioned type of control system, a support means is necessary to support the swash plate. Traditionally, this has comprised a part spherical annular bearing to provide for tilting of the swash plate for cyclic pitch changes, the bearing being mounted for vertical sliding movement in order to effect collective pitch changes. In this type of control system, torque is normally transmitted through a scissors linkage connected between the rotor hub and the rotatable ring, and it is often necessary also to provide a non-rotating scissors linkage between the non-rotatable ring and the helicopter structure.

Whilst operationally satisfactory, the above types of control means, and especially the particular support means used, are fabricated from a large number of parts which increases complexity, weight and cost. Furthermore, maintenance of these complex assemblies may also be time-consuming and costly.

Accordingly, the invention provides a helicopter rotor including a rotor hub adapted for rotation about an axis and supporting a plurality of generally radially extending rotor blades, and pitch control means adapted to change the pitch of the rotor blades both cyclically and collectively wherein the pitch control means includes support means comprising a universal joint located concentrically of the axis of rotation and having three equi-spaced radially extending pins each supporting a radially slidable and rotatable bearing having a spherical external surface, the bearings being located in axially extending tracks having a circular cross-sectional shape for rolling engagement by the bearings.

In one embodiment of the invention the universal joint may be located intermediate the ends of a central control spindle having an upper end operatively attached to the rotor blades and a lower end operatively attached to input control means. Conveniently, the pins may extend radially outwardly from an outer surface of the spindle and the tracks may be formed internally of an annular housing attached to the rotor hub. The pins may be formed integral with the spindle.

Preferably, the central control spindle is hollow with an internal surface flared outwardly towards each end, a stationary hollow shaft extending through the spindle and upwardly through the rotor hub. Conveniently the stationary hollow shaft is adapted to support equipment above the rotor.

In another embodiment of the invention the universal joints may be located internally of a swash plate having a rotatable inner ring operatively attached to the rotor blades and a non-rotatable outer ring operatively attached to input control means. In such an embodiment, the pins may extend radially outwardly from a central spindle attached to the rotor hub and the locating tracks may be formed internally of the swash plate rotatable ring.

The invention will now be described by way of example only and with reference to the accompanying drawings in which.

Figure 1:
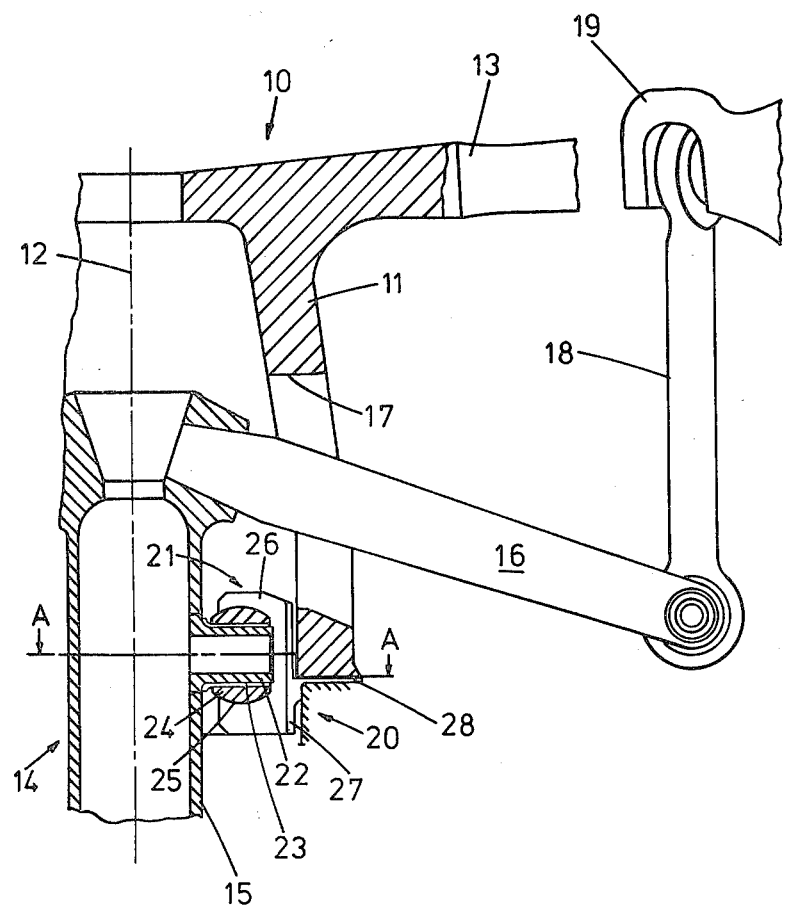
FIG. 1 is a fragmentary part sectional side elevation of a helicopter rotor constructed in accordance with one embodiment of the invention.

Referring now to FIG. 1, a helicopter rotor generally indicated at 10 comprises a hollow rotor hub 11 mounted on a gearbox (not shown) for rotation about a generally vertical axis 12.

The hub 11 includes a plurality of radially extending arms 13 each adapted to support a rotor blade (not shown) in a manner permitting rotation of the blade about its longitudinal axis to provide for changes in the blade pitch during operation.

Blade pitch control means, generally indicated at 14, includes a generally vertical control spindle 15 located centrally of the rotor hub 11. A lower end (not shown) of control spindle 15 is connected through a suitable bearing to control means operable by the pilot, and an upper end supports a plurality of radially extending spider arms 16.

Each of the arms 16 extends through an aperture 17 in the hub 11 and terminates at an outer end pivotally connected to one end of a generally vertical, adjustable control rod 18, the other end of which is pivotally connected to a pitch control lever 19 operatively associated with one of the rotor blades.

Control spindle 15 is supported internally of the hub 11 intermediate its upper and lower ends by support means generally indicated at 20 (FIGS. 1 and 2) which permits both tilting and vertical movements of the spindle 15 as well as simultaneous tilting and vertical movements.

Support means 20 comprises a universal joint 21 having three equi-spaced radially extending pins 22 formed integral with the spindle 15. Each pin 22 supports a dry bearing 23 which carries a rotatable bearing 24 having a part spherical external surface 25.

The bearings 24 are each located in an axially extending track 26 formed internally of an annular housing 27 fixedly attached to hub 11 through a bolted external flange 28. The tracks 26 have a part-circular cross-sectional shape (FIG. 2) having a radius corresponding approximately with the radius of the part-spherical surface 25 of the bearings 24, the parts being constructed so that axial movement in the tracks 26 is accomplished by rolling of the bearings 24 on the pins 22. Thus, the bearings 24 are capable of axial movement in the tracks 26 as well as radial sliding movement on the dry bearings 23, thereby permitting simultaneous tilting and axial movements of the spindle 15 whilst also transmitting torque from the rotor hub to the control spindle.

Figure 3:
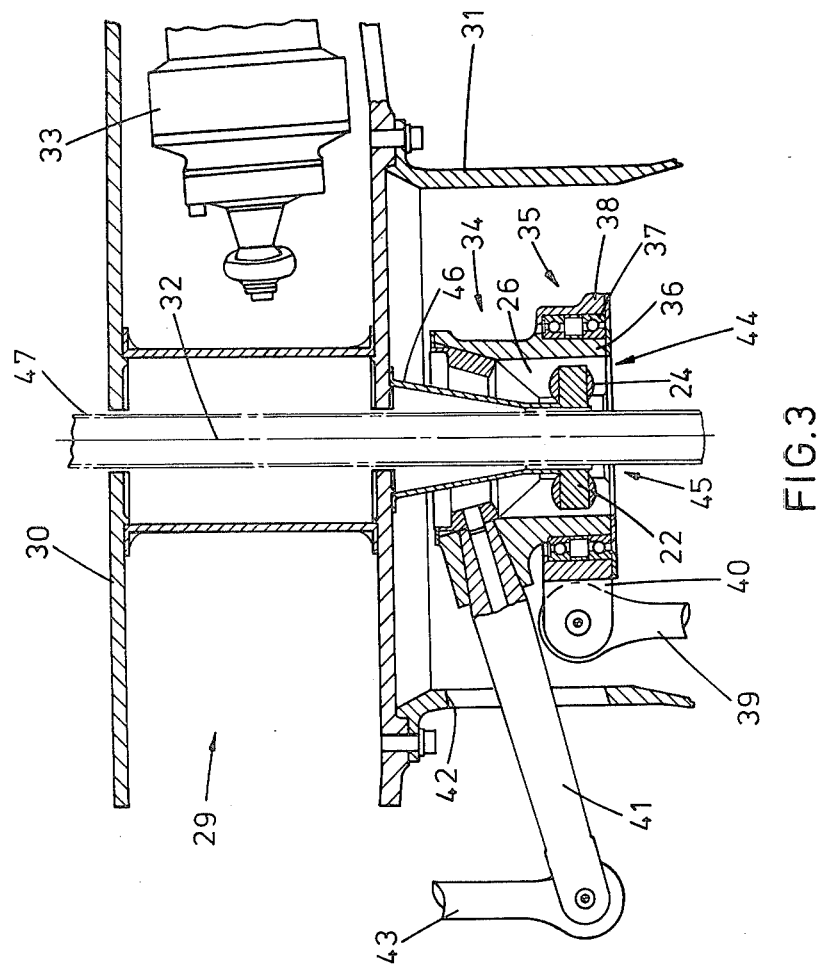
FIG. 3 is a fragmentary part sectioned side elevation of a helicopter rotor constructed in accordance with a further embodiment of the invention; and, FIG. 4 is a fragmentary part sectioned side elevation of a helicopter rotor constructed in accordance with a yet further embodiment of the invention.

In the embodiment illustrated in FIG. 3, a helicopter rotor generally indicated at 29 includes a rotor hub 30 bolted to the top of a hollow drive shaft 31 for rotation about a generally vertical axis 32. The hub 30 supports a plurality of elastomeric bearings 33, each of the bearings 33 providing support for a radially extending rotor blade (not shown) in a manner to permit rotation of the blades about a longitudinal axis thereof to provide for blade pitch change movements.

Pitch control means, generally indicated at 34, is located centrally of the shaft 31 and comprises a swash plate 35 having an inner rotatable ring 36 supporting bearings 37 which carry an outer non-rotatable ring 38. Three generally vertical input control rods 39 (one only being shown) are pivotally attached to lugs 40 extending radially outwardly from a circumferential region of non-rotatable ring 38. The inner rotatable ring 36 is extended upwardly and supports a plurality of radially extending spider arms 41 equal in number to the number of rotor blades, and which protrude through apertures 42 in the wall of the shaft 31 for pivotal attachment to generally vertically extending adjustable control rods 43 attached to pitch control levers (not shown) operatively associated with the rotor blades.

Support means, generally indicated at 44, is located centrally of the swash plate 35 to maintain the swash plate concentric of axis 32, and comprises a universal joint 45 similar to the universal joint 21 previously described with reference to the embodiment of FIGS. 1 and 2. Like reference numerals will be used to identify similar parts.

In the embodiment of FIG. 3, the three pins 22 are formed integral with one end of a hollow spindle 46 depending from a bolted attachment to the rotor hub 30 and a hollow stationary shaft 47 is located through the spindle 46 concentrically of the axis of rotation 32 and is extended upwardly to protrude from an upper surface of the rotor hub 30. The tracks 26 for the part-spherical bearings 24 carried by the spindles 22 are formed on an inner surface of the rotating ring 36.

Figure 4:
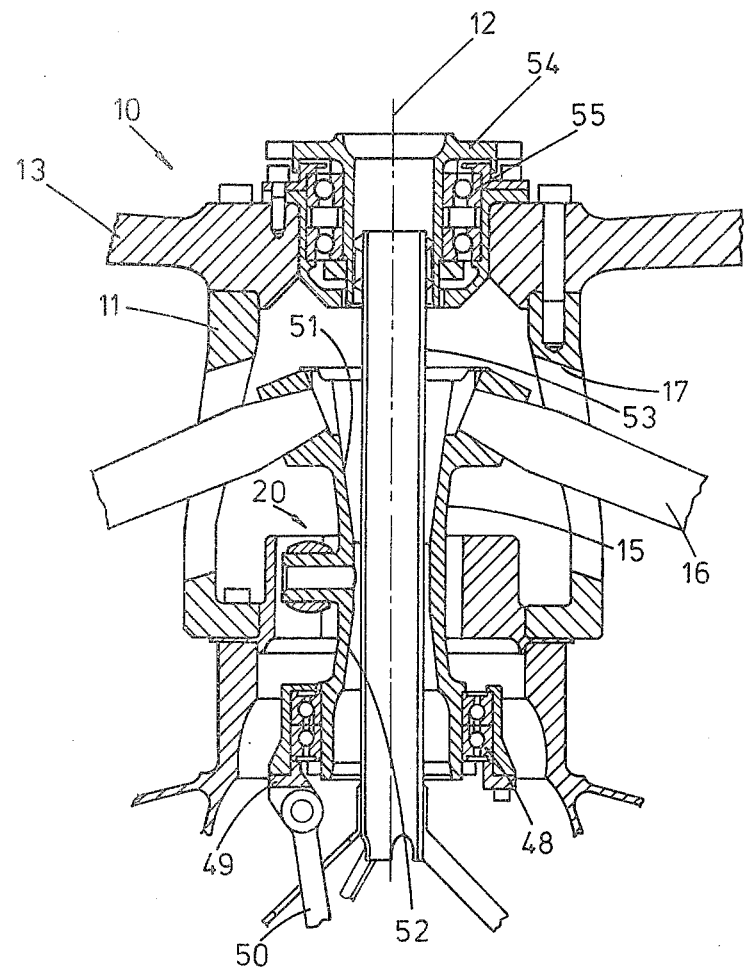

The embodiment of FIG. 4 is a modification of that previously described with reference to FIGS. 1 and 2. In FIG. 4, the hollow central control spindle 15 is shortened so as to be generally symmetrical in length about the support means generally indicated at 20 which is identical to the support means 20 of FIGS. 1 and 2. The lower end of control spindle 15 supports bearings 48 which in turn support a non-rotatable ring 49 operatively connected to a plurality of input control rods 50 (one only being shown).

It will be noted that the internal surface of the spindle 15 flares outwardly towards each end as indicated at 51 and 52 respectively. The lower end of a hollow shaft 53 is rotationally fixed to non-rotating structure (not shown), and the shaft 53 is extended upwardly through the spindle 15 to terminate at an upper end which is rotationally fixed to a flanged boss 54 supported in bearings 55 located in a central aperture in the arms 13 of the rotor hub 11.

Figure 2:
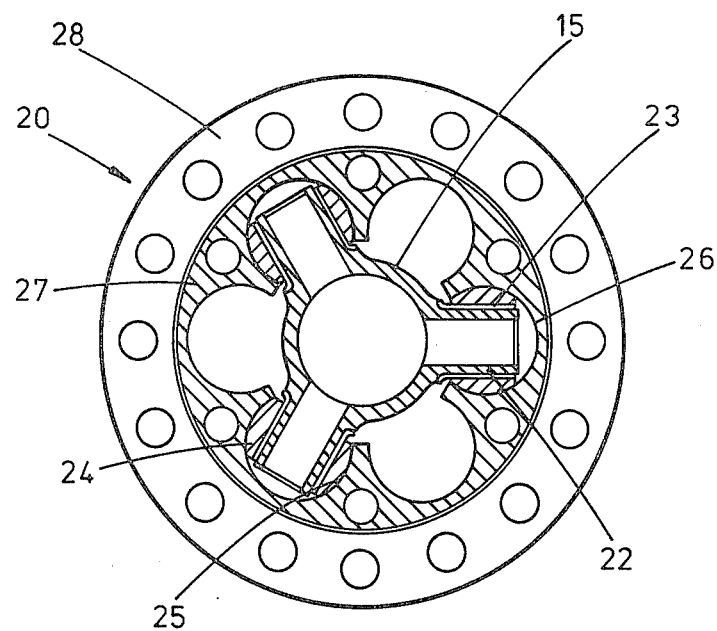
FIG. 2 is a sectioned view taken along lines A—A of FIG. 1.

In operation of the embodiment of FIGS. 1 and 2, tilting of the lower end of spindle 15 in any direction is permitted by a combination of axial and radial movements of the bearings 24 in the tracks 26, and is thereby transmitted through the arms 16, control rods 18 and pitch control levers 19 to change the pitch of the rotor blades cyclically as the rotor hub is rotated about axis 12. Axial movement of the spindle 15 is permitted by rolling of the bearings 24 in the tracks 26 to change the pitch of the rotor blades collectively, and it will be understood that these tilting and axial movements can be achieved simultaneously to provide for simultaneous collective and cyclic pitch changes of the rotor blades.

In the embodiment of FIG. 3, tilting and axial movement of the swash plate 35 to effect cyclic and collective pitch changes is accomplished by appropriate vertical movements of the control rods 39. These movements are permitted in a manner similar to that previously described in relation to the embodiment of FIGS. 1 and 2 except that in this case it is the track bearing member (i.e. the inner rotatable ring 36) which is caused to move relative the pins 22. Thus, axial movement of the swash plate 35 is permitted by rolling of the bearings 24 along the tracks 26, and tilting is permitted by a combination of the same rolling movement and a radial sliding movement of the bearings 24 along the pins 22.

An advantage of the embodiment of FIG. 3, stemming from the arrangement in which the pins 22 remain stationary during tilting of universal joint 45, is that it permits the stationary shaft 47 to be routed upwardly through the rotor hub to facilitate the attachment of equipment above the rotor and also the routing of power supplies and control signal lines to any such equipment.

A similar facility is provided by the arrangement of the embodiment of FIG. 4 by virtue of the flared internal surfaces 51 and 52 of the central control spindle 15 which permits tilting of the spindle 15 about the support means 20 in a manner identical to that previously described with reference to FIGS. 1 and 2, and without interference with the hollow shaft 53. In addition, in this embodiment, the provision of the stationary flanged boss 54 at the top of the hub provides a convenient attachment for equipment that it may be desired to mount above the rotor. As in the previous embodiment, any necessary power supplies and control signal lines are routed through the shaft 53.

It will be apparent that, in all the embodiments hereinbefore described, the universal joints 20 and 43, respectively, also serve to transmit torque from the rotating rotor hub to the pitch control means to ensure correct operational alignment of the spider arms 16 and 41 with the rotating rotor blades.

Thus, a helicopter rotor according to this invention incorporates a control system which includes a simple, efficient and compact support means to accommodate the aforementioned tilting and axial movements of a rotor blade pitch control means as well as providing the necessary torque transmission. These features are provided by a single assembly having a minimal number of parts, thereby minimising weight and cost. As an exemplary comparison only, the aforementioned fabricated support means with the axial splines has twenty-two machined parts together with twenty attachment bolts and nuts, whereas the present support means consists of seven parts only, and represents a weight saving of about fifteen pounds (6.8 kg). Furthermore, the support means provides smooth vibration free running and constant angular motion regardless of its inclination, so that the central spider is relieved of undesirable accelerations that may be caused by Coriolis forces during operation.

The simplicity and small number of parts of the support means 20 and 44 as well as, in the embodiment of FIGS. 1 and 2, the use of dry bearings 23, minimises maintenance requirements and simplifies maintenance procedures. The compact nature of support means 20 and 44 is also of advantage in that it permits either a reduction in the rotor hub diameter, thereby further reducing weight or, in the embodiments of FIGS. 1, 2, and 4 the incorporation of a stiffer yet lighter control spindle 15.

Furthermore, a rotor according to the invention offers more space internally of a rotor hub as illustrated in FIGS. 3 and 4 which can be used advantageously to mount and supply ancillary equipment above the rotor hub. Clearly, of course, conventional rotor facilities such as blade fold mechanisms and blade de-icing systems can be supplied and controlled by means routed through the stationary central shafts 47 and 53 respectively. Also, since the support means 20 and 44 is self-centering when the bearings 24 are located in the tracks 26, shimming to control play is eliminated, thereby simplifying both assembly and maintenance procedures.

Whilst several embodiments of the invention have been described and illustrated, it will be understood that many modifications can be made without departing from the scope of the invention as defined in the appended claims. For example, in the embodiments of FIGS. 1, 2 and 4, the pins 22 could be formed on a separate housing adapted for attachment externally of the spindle 15. Alternatively, in all embodiments, the location of the rspective parts of the support means could be reversed. Thus, in the embodiments of FIGS. 1, 2 and 4, the pins 22 may extend radially inwardly from an attachment to the hub 11 and the tracks 26 may be rotationally fixed externally of the spindle 15 either by being formed integral therewith or in a separate housing for attachment thereto, whereas in the embodiment of FIG. 3, the pins may extend radially inwardly from the inner ring 36, and the tracks 26 may be formed on the spindle 46. The bearings 24 may be mounted on the pins 22 by needle bearings or bushes of nylon, PTFE or oil impregnated metal.

What is claimed is:

1. A helicopter rotor including a rotor hub adapted for rotation about an axis, a plurality of generally radially extending rotor blades supported on said rotor hub, pitch control means including support means comprising a universal joint located concentrically of the axis of rotation, said universal joint including three equi-spaced radially extending pins, a radially slidable and rotatable bearing having a spherical external surface on each pin, and an axially extending track for each bearing having a circular cross sectional shape for rolling engagement by the bearing, whereby said pitch control means is adapted to cause relative axial movement of the bearings in the respective tracks to achieve both collective and cyclic pitch changes of the rotor blades.

2. A rotor as claimed in claim 1, wherein the universal joint is located intermediate the ends of a central control spindle having an upper end operatively attached to the rotor blades and a lower end operatively attached to input control means.

3. A rotor as claimed in claim 2, wherein the pins extend radially outwardly from an outer surface of the control spindle and the tracks are formed internally of an annular housing attached to the rotor hub.

4. A rotor as claimed in claim 3, wherein the pins are formed integral with the spindle.

5. A rotor as claimed in claim 2, wherein the central control spindle is hollow and has an internal surface flared outwardly towards each end, a stationary hollow shaft extending through the spindle and upwardly through the rotor hub and being adapted to support equipment above the rotor.

6. A rotor as claimed in claim 1, wherein the universal joint is located internally of a swash plate having a rotatable inner ring operatively attached to the rotor blades and a non-rotatable outer ring operatively attached to input control means.

7. A rotor as claimed in claim 6, wherein the pins extend radially outwardly from a central spindle attached to the rotor hub and the locating tracks are formed internally of the swash plate rotatable ring.

8. A rotor as claimed in claim 7, wherein the central spindle is hollow, a stationary hollow shaft extending vertically through the spindle and upwardly through the rotor hub and being adapted to support equipment above the rotor.

9. A rotor as claimed in claim 5, wherein an upper end of said stationary hollow shaft is rotationally fixed to a flanged boss rotationally mounted in an upper surface of the rotor hub and adapted to support equipment above the rotor.

* * * * *